United States Patent
Reddy et al.

(10) Patent No.: US 9,648,141 B2
(45) Date of Patent: May 9, 2017

(54) TOKEN DELEGATION FOR THIRD-PARTY AUTHORIZATION IN COMPUTER NETWORKING

(71) Applicant: Cisco Technology, Inc., San Jose, CA (US)

(72) Inventors: Tirumaleswar Reddy, Bangalore (IN); Daniel Wing, San Jose, CA (US); Prashanth Patil, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 36 days.

(21) Appl. No.: 14/674,596

(22) Filed: Mar. 31, 2015

(65) Prior Publication Data
US 2016/0294803 A1    Oct. 6, 2016

(51) Int. Cl.
*H04L 29/00* (2006.01)
*H04L 29/06* (2006.01)

(52) U.S. Cl.
CPC .......... *H04L 67/42* (2013.01); *H04L 63/0807* (2013.01)

(58) Field of Classification Search
CPC combination set(s) only.
See application file for complete search history.

(56) References Cited

U.S. PATENT DOCUMENTS

| | | | |
|---|---|---|---|
| 2004/0088349 A1* | 5/2004 | Beck | H04L 63/0407 709/203 |
| 2014/0115159 A1* | 4/2014 | Zisimopoulos | H04W 28/24 709/225 |
| 2015/0263916 A1* | 9/2015 | Phillips | H04L 43/08 709/224 |

OTHER PUBLICATIONS

Charles Eckel, Mar. 19, 2015, Application Enabled Open Networking (AEON), Charles Eckel; pp. 1-5.
Feb. 20, 2015, OAutho-Wikipedia; http://en.wikipedia.org/wiki/OAuth, downloaded Feb. 20, 2015.
Internet Engineering Task Force (IETF), Jan. 2013, Category: Informational M. McGloin; ISSN: 2070-1721 IBM; OAuth 2.0 Threat Model and Security Considerations; pp. 1-72.
Jul. 3, 2013, PCP Flowdata Option; pp. 1-17.
PCP Extension for Thrid Party Authorization, Apr. 2, 2014, PCP Extension for Thrid Party Authorization; pp. 1-15.
Zero-rating, sender-pays, toll-free data . . . The next business model for mobile broadband?, Feb. 20, 2015, Zero-rating, sender-pays, toll-free data; http://disruptivewireless.blogspot.comJ2011/07/zero-rating-sender-pays-toll-free-data.html.

* cited by examiner

*Primary Examiner* — Ghazal Shehni
(74) *Attorney, Agent, or Firm* — Lempia Summerfield Katz LLC

(57) ABSTRACT

In one embodiment, first content is served by an application server to a client computer through an Internet service provider network. The first content includes a link to second content on a third-party server. A token request is sent from the third-party server to the application server in response to selection of the link by the client computer. A token is provided to the third-party server by the application server in response to the token request. The token is configured to authorize data flow at a bandwidth for the second content by the Internet service provider network to the client computer. The data flow is authorized based on an agreement for the bandwidth between an operator of the application server and an operator of the Internet service provider network.

20 Claims, 3 Drawing Sheets

TOKEN DELEGATION FOR THIRD-PARTY AUTHORIZATION IN COMPUTER NETWORKING

TECHNICAL FIELD

This disclosure relates in general to the field of computer networks and, more particularly, to token delegation for authorizing third-party resource usage.

BACKGROUND

In a content delivery network (CDN), an existing network is used for large scale content delivery, such as for video. The CDN operates with prefetching, dynamically caching content on distributed surrogates (e.g., caching servers) or redirecting to a third-party content server. For redirection, the CDN has an agreement with the third-party content server to provide content. In an example of redirection, a CDN redirects to a third-party server to stream videos of an event, such as a sporting event, or to play video from other content providers.

For streaming video pursuant to the hypertext transfer protocol (HTTP) to a client computer, a host signals desired flow characteristics to the Internet service provider (ISP) for the client computer. The ISP provides special treatment to this flow based on a token provided by the client computer and obtained by the client computer from the CDN. The token authorizes the special treatment by the ISP for the flow. Because the ISP has an agreement with the CDN, the ISP validates and honors the token, providing the desired resources for serving the content through the ISP to the client computer. The provision of the flow is from a specific server of the CDN. If the CDN redirects to a different third-party server for some content, the ISP may not provide the desired flow characteristics for the redirected content. This may result in redirection causing a reduced service by the CDN to the client computer.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

General Overview

Figure 1:
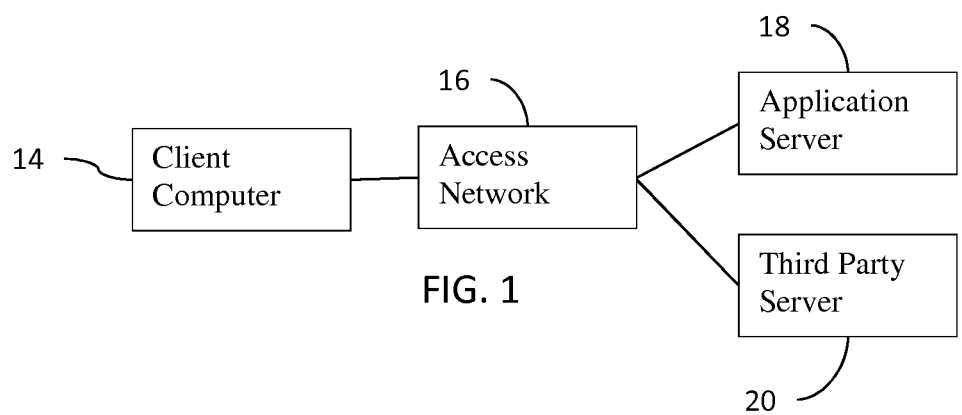
FIG. 1 is a simplified block diagram of an example network for token delegation for third-party authorization.

When a CDN redirects from an application server to a third-party server, a token may be provisioned for the third-party server hosting the redirected content. The third-party server requests and obtains a delegated token from the application server. The delegated token is used to provision resources of the ISP for the data flow from the third-party server to the client based on the agreement between the ISP and the operator of the application server.

In a first aspect, first content is served by an application server to a client computer through an Internet service provider network. The first content includes a link to second content on a third-party server. A token request is sent from the third-party server to the application server in response to selection of the link by the client computer. A token is provided to the third-party server by the application server in response to the token request. The token is configured to authorize data flow with certain flow characteristics (e.g., bit rate, loss, delay, or a bandwidth) for the second content by the Internet service provider network to the client computer. The data flow is authorized based on an agreement for the bandwidth between an operator of the application server and an operator of the Internet service provider network.

In a second aspect, a first data flow to a user computer from a first content server through an access network server is added. The first data flow is established at a resource level of the access network server based on a first agreement between an operator of the access network sever and an operator of a second content server. The resource level is authorized with an OAuth token from the second content server for the first content server.

In a third aspect, a memory is configured to store audio, video, or both audio and video. An interface is configured to receive a first token request from a client device. The first token request includes an identification of an access network server and an identification of an application server. A processor is configured to, using the interface, transmit a delegated token request to the application server, receive a delegated token from the application server, and transmit the delegated token to the client device. The audio, video, or both are served by the processor using the interface to the client device in a data flow through the access network server as validated by the application server.

Example Embodiments

OAuth 2.0, Kerberos, or other token delegation is provided for third-party authorization. A redirected server obtains a delegated token for itself from the origin server of the CDN. The token is only made available for video streams or other content served from the third-party redirected server. The delegation token includes or is provided with metadata of the flow characteristics (e.g., bit rates, loss, or delay) or other resource requirements established for the original server of the CDN with the ISP. The delegation token and metadata are provided to the client for provisioning the packet flow through the ISP from the third-party redirected server. The client uses this token to avail treatment for the packet flow served from the redirected content provider. The end user (e.g., client) gets better quality of experience as though the third-party redirected server (e.g., redirected web site) had also gone to the trouble of making a business agreement with the ISP.

FIG. 1 shows an example network for use of a delegated token. The network includes a client computer 14, an access network 16, an application server 18, and a third-party server 20. Additional, different, or fewer components may be provided in the network, such as additional application servers of the CDN, additional access networks for different client computers, and/or additional third-party servers. The network may include additional components, such as routers, firewalls, or servers.

The network is managed by, hosted by, or operated in part by different entities or operators. A user, such as a person or business, provides the client computer 14. An ISP or other provider of network access provides the access network 16. An operator of the CDN or other content delivery entity provides the application server 18. Another CDN, ISP, company, or content provider provides the third-party sever 20. The provider for the third-party server 20 is a different entity than the provider of the CDN, such as a different business.

While shown as an overall network with different devices, the devices themselves may be part of different networks of devices. Each of the networks is a local area network, wide area network, intranet, enterprise, virtual local area network, or combinations of networks. The networks are interconnected through or as the Internet. Any form of network may be provided, such as a transport network, data center, or other wired or wireless network. The overall network may be applicable across platforms, extensible, and/or adaptive to specific platform and/or technology requirements through link-negotiation of connectivity.

The network devices (e.g., client computer 14, access network 16, application server 18, and third-party server 20) are connected over links through ports. Any number of ports and links may be used. The ports and links may use the same or different media for communications. Wireless, microwave, wired, Ethernet, digital subscriber lines (DSL), telephone lines, T1 lines, T3 lines, satellite, fiber optics, cable and/or other links may be used. Corresponding interfaces are provided as the ports.

The client computer 14 may be, but is not limited to being, a computer, tablet, cellular phone, Wi-Fi capable device, laptop, mainframe, voice-over-Internet phone, or other user device. The client computer 14 connects with wires, such as Ethernet cables, or wirelessly, such as with Wi-Fi. The connection may be relatively fixed, such as for personal computers connected by wires to switches or modems. The connection may be temporary, such as associated with mobile devices that access the network as needed or when in range.

The client computer 14 includes a browser, other program, or application that accesses content provided by the CDN on the application server 18 and/or content provided by the third-party server 20. In one embodiment, the client computer 14 operates pursuant to the port control protocol (PCP) to control how data (e.g., packets) are handled to provide for the data flow of content to the client computer 14. In other embodiments, extensions to the session transversal utilities for NAT (STUN) protocol are used. Other protocols for provisioning data flow to the client computer 14 by the access network 16 may be used.

The access network 16 is one or more servers, routers, switches, firewalls, or other network components for providing content to the client computer 14 and/or for transmitting information from the client computer 14 to other networks or devices. Any access network 16 may be used, such as a mobile or cellular network, an ISP network, or other network for connecting user devices to the Internet or other network. The access network 16 operates with PCP, STUN, or other protocol for establishing data flow.

The application server 18 and third-party server 20 are servers, routers, switches, or other network devices for hosting content, such as part of a CDN or video conferencing. The application server 18 may be the same or different type of device as the third-party server 20. The application server 18 and/or third-party server 20 host video, audio, conference data (e.g., shared desktop or database data), or combinations thereof.

The various components of the network 10 are configured by hardware and/or software to request content, provide content, request tokens, establish data flow, provide tokens, validate tokens, authorize tokens, and/or combinations thereof. Logic is encoded in one or more non-transitory computer-readable media for operating the client computer 14, the components of the access network 16, the application server 18, and/or the third-party server 20. The media is a memory. Memories within or outside the network may be used. The logic includes code for execution by a processor or processors. When executed by a processor, the code is used to perform operations for establishing data flow in the access network 16 from the third-party server 20 based on a relationship of the application server 18 with the access network 16.

In an example use of the network of FIG. 1, a video streaming operator, acting as a CDN, hosts servers (e.g., the application server 18) for streaming through an ISP (e.g., access network 16) to subscribers requesting video content as clients (e.g., client computer 14.). The video streaming operator has an agreement with the ISP to provide resources for streaming, such as assigning priority for video from the operator hosted servers, in exchanged for payment. However, the video streaming operator may not host all of the content, so contracts with a third-party to provide some content. In another approach, a third-party may pay the video streaming operator to connect with the third-party content from a third-party server (e.g., third-party sever 20) as part of the video streaming service of the CDN to the subscribers. Since token use is specific to servers, computer network-based arrangements are made to provide the third-party content as if being provided by the CDN (i.e., resource level by the ISP as if the content is from the CDN). Token delegation is provided as a technical solution for the technical problem resulting from computer networking.

In other examples, delegation token arrangements are made for third-party content to be under an agreement and service provided to clients in an application enabled open networking (AEON) setting.

The request process for obtaining the delegation token from the original server makes for easier billing. The ISP bills the application server, which in-turn passes the cost to the third-party redirected server. The third-party web site needs to only make one business agreement with the application server. The ISP may prioritize content served by the uniform resource identifier (URI) for the redirected server. This allows the original server to embed the URI for redirection in the content from the original server. The original server may be a zero-rated site (e.g., video provider as original server with an agreement with the ISP to compensate the ISP for level of service) or may not be zero-rated.

Figure 2:
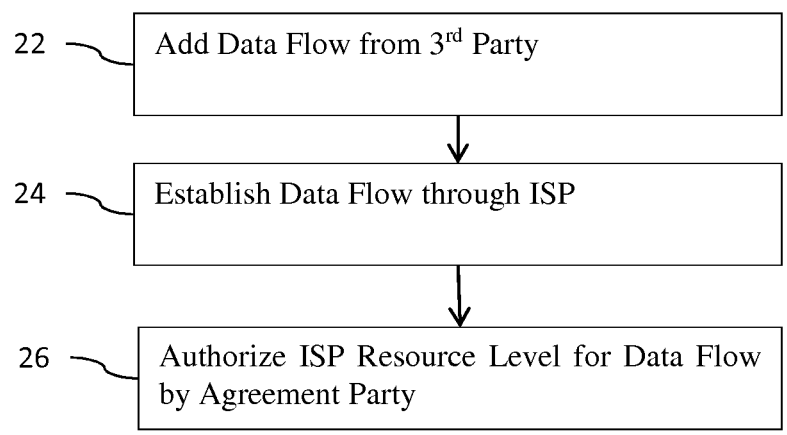
FIG. 2 is a flow chart of one embodiment of a method for authorizing data flow for content from a redirected third-party server.

FIG. 2 shows one embodiment of a method for delegation token use. A third-party server receives a delegation token to provide content based on a relationship of an access network (e.g., ISP or mobile device network) and a CDN. The method provisions content delivery from a redirected third-party server through the access network for a client. The data flow provision by the access network is made pursuant to arrangements between the access network operator and the CDN operator rather than the operator of the third-party server. Other contractual arrangements and/or provisioning may be provided.

Figure 4:
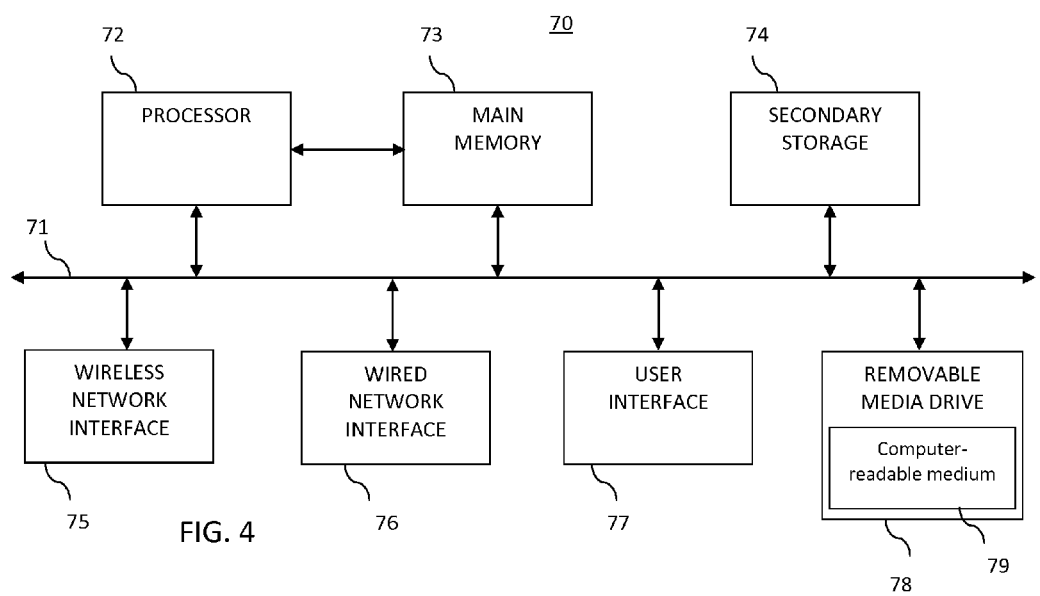
FIG. 4 is a block diagram of a network device, according to one embodiment, for token delegation for third-party authorization.

The method is performed by the network of FIG. 1, a component of the network of FIG. 1, the apparatus of FIG. 4, a server, a processor, or other device or devices. In one embodiment, the method is implemented by a server for the access network. In other embodiments, the method represents provisioning by a network of servers. While server is used below, other network devices hosting content and/or managing network operation may be used instead or as well.

Figure 3:
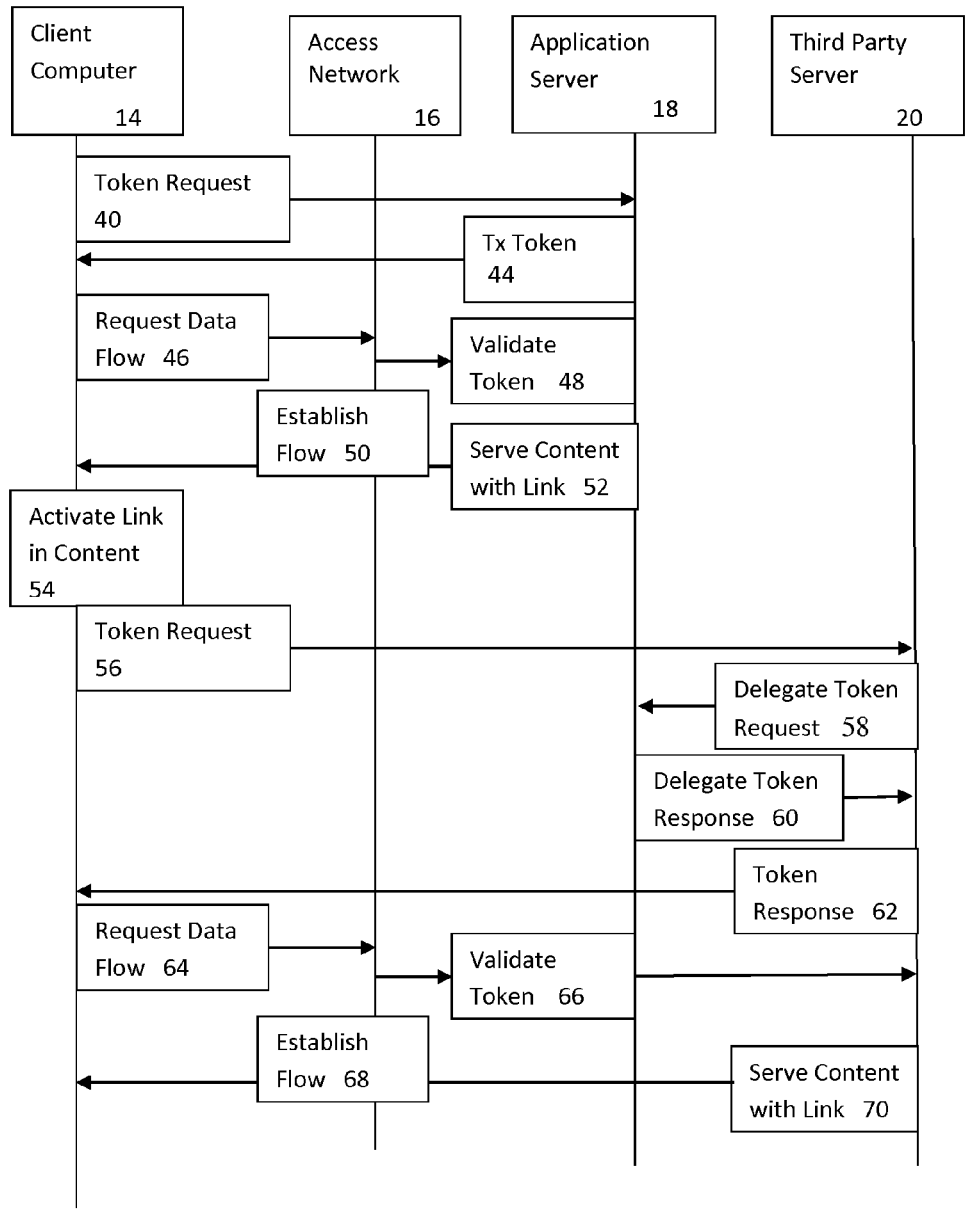
FIG. 3 is an example communications diagram of a method for token delegation for third-party authorization.

Additional, different, or fewer acts may be provided. For example, any of the acts of FIG. 3 are provided. As another example, acts for communicating between servers, serving content, requesting content, requesting tokens, providing tokens, validating tokens, and/or authorizing tokens are provided.

The acts are performed in the order shown or another order. For example, act 26 is performed prior to act 22. As another example, acts 22 and 24 are performed simultaneously or as part of a same process. The acts as shown and described are for illustrative purposes. In alternative embodiments, one or several of the acts may be performed in a different order and/or parallel.

In act 22, a data flow is added. The data flow is of packets in a tunnel, route mapping, or other communication channel or channels for content through an access network to a user computer. This communication path is fixed or may vary over time. Any mapping may be used. The data flow is of content from a content server. For example, an access network provisions for video data to be streamed from a redirected content server to the user computer. Other types of content than video may be communicated.

In act 24, the data flow is established at a resource level. The access network may dedicate or assign any bandwidth or other capability to the data flow. One or more access network servers are configured to provide the data flow at a desired resource level. The provision includes metadata about the flow characteristics (e.g., minimum, maximum, or average bandwidth, loss, delay, or other characterizations). For example, a priority for packets that are part of the data flow is set higher than priorities for other types of packets (e.g., email packets). The higher priority results in selection for routing or other processing in content delivery prior to selection of other content. The content residing in a buffer with the higher priority is processed first or before content with lower priority. As other examples, minimum packet loss, minimum jitter, minimum bandwidth or rate, or combinations of any characteristics of the data flow may be assigned to a given data flow. The access network establishes the data flow to meet the flow characteristics. The processing is configured to meet the set flow characteristics.

In one embodiment, the resource level is established by the access network based on an agreement between an operator of the access network and an operator of a different content server, such as a CDN operator. The data flow is established for content from a redirected third-party server to the client computer based on an agreement between the CDN operator and the access network operator. The CDN may contract with the access network to provide content at a given bandwidth or rate and/or with other flow characteristics. The third-party server provides content as if part of the CDN service due to redirection from the CDN. Rather than requiring the third-party server to contract with the access network, the third-party server uses a delegation token from the CDN so that the access network establishes the desired data flow.

In act 26, the resource level is authorized with the delegation token. Any token may be used, such as an OAuth token or a Kerberos token. In one embodiment, an OAuth handle or opaque token is used. The handle token references internal data structure within the authorization server (e.g., the application server of the CDN). This internal data structure contains the attributes of the token, such as user id (UID), scope, flow characteristics like upstream/downstream bandwidth, packet loss, and jitter for the content, and any other information. The handle token enables simple revocation and does not require cryptographic mechanisms to protect the token content from being modified. On the other hand, the handle token requires communication between the issuing and consuming entity (e.g., the authorization server and access network server) in order to validate the token and obtain token-bound data. The application or third-party server does not need to be able to interpret the token directly, but uses the token for authorization.

The OAuth token operates with hypertext transfer protocol (HTTP) to provide secure delegated access to the content. The token is issued to the client computer for authorizing the data flow through the access network. For example, an application server of the CDN issues an OAuth token to the client computer in response to a request for content. The client computer provides the OAuth token to the access network. A server of the access network validates the OAuth token for establishing the data flow.

For the delegation token, the third-party server receives a request for content associated with the CDN or other application server. For example, the application server serves content with a link or URI (e.g., an advertisement served with the content) to the content of the third-party server. By serving the content with the link, the CDN expects the associated content from the third-party server to benefit from the same resource level as agreed with the access network. To facilitate the resource level, the access network validates the delegation token. The third-party server requests and receives a delegation token from the CDN or application server. This token is provided to the client computer for use in establishing the data flow. The client computer provides the delegation token to the access network server. The delegation token is used by the access network to validate the data flow at the resource level based on the agreement with the CDN. The application server of the CDN authorizes the delegation token for the access network.

Since the delegation token originated from the CDN, the access network validation is provided as if the third-party server, for the relevant content, is to benefit from the agreement. The access network server verifies that the agreement exists between the application server or CDN and the access network. The token is used to authorize the data flow from the particular server, such as the third-party server. For example, the handle token is validated by the access network server with the application server of the CDN. Based on the agreement verification and authorization using the token, the data flow is established at a resource level dictated by the agreement.

FIG. 3 shows one embodiment of a communications diagram of a method for token delegation for third-party authorization. In the example of this embodiment, the method and corresponding communications provide for two data flows: one from the application server 18 of a CDN and another from the third-party server 20 as a redirected data flow. The data flow from the third-party server 20 is authorized to use the resource levels of the access network 16 using a delegation token. Acts 40-52 correspond to establishing the flow from the application server 18, and acts 54-70 correspond to establishing the flow from the redirected third-party server 20.

The method of FIG. 3 is performed by the devices shown. The client computer 14 performs acts 40, 46, 54, 56, and 64. The access network 16, such as a server of the access network 16, performs acts 50 and 68. The application server 18 performs acts 44, 48, 52, 60, and 66. The third-party server 20 performs acts 58, 62, and 70. Other devices may perform any one or more of the acts, such as a different server of the CDN than the application server 18 authorizing the token in acts 48 and/or 66. Any of the acts may involve operations by more than one component, such as the validation of the token in act 48 including the server of the access network 16 validating and the application server 18 authorizing the validation.

Additional, different, or fewer acts may be provided. For example, acts 40-52 are not performed as these acts relate to establishing flow for content from the CDN and do not use a delegation token. As another example, acts for any one of the devices (e.g., access network 16, application server 18, or third-party server 20) are performed with or without the other devices performing acts. In yet another example, token generation, routing, inspection, or other networking acts are performed in addition to the acts shown in FIG. 3.

The acts are performed in the order shown. The order is listed in numerical sequence and/or from top to bottom in FIG. 3. In alternative embodiments, the acts are performed in other orders.

In act 40, the client computer 14 requests a token, such as a handle token. An application or program on the client computer 14 requests the token from the application server. For example, an application for providing streaming video from a CDN is activated by the user. As another example, a user selects video for streaming in a browser. In response to the user selection of video to stream, user initiation of the video streaming application, and/or a request for information about available videos, the token is requested from the application server 18 of the CDN.

Any token request process may be used. In one embodiment, the OAuth protocol (e.g., OAuth 2.0) is used to obtain a handle token. In another embodiment, Kerberos is used. The token is requested.

The application server 18 receives the token request from the client computer 14. Pursuant to the OAuth protocol or other token protocol, the application server 18 generates the token, such as a handle token.

In act 44, the application server 18 transmits the token to the client computer 14. The token is transmitted with metadata for establishing the data flow. The metadata is transmitted in a same or different packet or packets as the token. The metadata may be integrated into the token itself. Alternatively, the metadata is transmitted separately from the token. In other embodiments, the access network 16 pre-caches or stores the metadata, and the application server 18 does not provide the metadata.

The metadata includes the flow characteristics for the data. For example, the metadata indicates the absolute or relative priority of the data flow. Bandwidth, rate, priority, jitter, latency, combinations thereof, or other data flow expectations are also provided as metadata. The characteristics may be for the data flow in general or may include variations for different parts of the data flow. For example, packets for initial frames of data encoded using compression have a higher priority than other frames of the video stream. The other frames may or may not have a higher priority than other types of traffic. The flow characteristics are ones agreed to between the operator of the application server 18 and the operator of access network 16. The flow characteristics may be based on the content as well, such as the agreement dictating a minimum resource level and the content dictating that minimum or a possible higher resource level.

In an example, the application server 18 transmits the token and metadata using OAuth procedures. The token and metadata are for establishing one or two-way video streaming of content from the application server 18 to the client computer 14 through the access network 16.

The token may be assigned a lifetime. The token is to be used within the lifetime for establishing the data flow or the token is invalid.

In act 46, the client computer 14 uses the token to request establishing or adding the data flow. The application or program on the client computer 14, upon receiving the token, transmits the token and metadata to a server of the access network 16. For example, PCP, STUN, or other protocol is used to signal a handle token and metadata of flow characteristics in a request to a PCP, STUN, or other server in an ISP. In PCP, the PCP client (i.e., the client computer 14) includes the token in a PCP request (e.g., token in a token access field) to the PCP server of the access network 16. The PCP client requests access to resources controlled by the application server and hosted by the PCP server of the access network 16.

In act 48, the application server 18 validates the token as received by the access network 16. The server of the access network 16 receives the request to add or establish a data flow. The request is received with the token and metadata. The timestamp for the token may be checked. If recent enough, the server, such as the PCP server, verifies that the token is valid. The server of the access network 16 communicates with the application server 18 in order to validate the token and obtain token-bound data, such as the content.

The application server 18 validates the token. Using OAuth or other procedures, the application server 18 confirms the data flow is to occur. If the token is successfully validated, the application server 18 just returns the token bound authorization data in the response. The token bound data may be the flow characteristics. The access network 16 may compare the flow characteristics from the token provided by the client computer 14 with flow characteristics sent or authorized by the application server 18 to detect misuse. Alternatively, additional and/or different information is returned.

The application server 18 may manage tokens, such as revoking tokens after a call or data flow is terminated. Even if the access network 16 does not close the mapping created for the data flow, the mapping may be later closed by revocation. As part of validation, such as through providing the metadata, the application server 18 describes the flow characteristics for the data flow to the access network 16 and the access network indicates the ability to accommodate the data flow.

The server (e.g., PCP server) of the access network 16 uses the token to authorize the data flow with the application server 18. The server of the access network 16 matches the returned authorization data with what is requested in the request sent by the client computer 14. If the authorization sets match, the server of the access network 16 honors the request. If the authorizations do not match, then the authorization fails. For failure, content may be provided, but not at a dedicated resource level. Alternatively, the content is not provided.

In act 50, the access network 16 establishes the data flow for the requested content from the application server 18. The mappings for the data flow are created. Upon token validation by the application server 18, a data flow is mapped to receive the authorized flow characteristics. The server of the access network 16 takes appropriate action, such as allowing the request from the client computer 14 to create mappings on the server of the access network 16.

In act 52, content is served. The requested content is served to the client computer 14 through the access network 16. The mappings to establish the data flow are used. Token-bound data, such as the user selected content, is transmitted from the application server 18 to the client computer. The content is served based on the token.

In one embodiment, the content is served to the client computer 14 where the operator of the client computer 14 pays for access to the content. The operator of the client computer 14 may pay the access network 16 for access to the Internet in general. The operator of the application server 18 in turn has a tie-up or agreement with the access network 16 to provide the content to the client computer 14 using mappings providing a given resource level, such as at a minimum bandwidth or rate. In other embodiments, the application server 18 hosts as a zero-rated site. The operator of the client computer 14 may not pay the access network 16. The access network 16 receives payment from the CDN (e.g., operator of the application server 18).

The served content includes a link to other content hosted by the third-party server 20. The link is a URI provided in the content or with the content. For example, an advertisement is provided with the URI. As another example, cross-reference or other information presentation is provided with the URI. Other links than a URI may be used.

The link being in the content from the CDN indicates a relationship between the operator of the application server 18 and the operator of the third-party server 20. The relationship may be an agreement for the third-party server 20 to host content for the application server 18. Other relationships are possible, such as the third-party server 20 paying the application server 18 for advertising the content of the third-party server 20 in the content of the application server 18.

The link is to other video, audio, conference, and/or other types of content. The content may be desirably viewed with the resource level associated with the content from the application server 18. For example, the link is a URI to video content, such as a movie preview, recorded video, or live event.

In act 54, the user directly or indirectly activates the link to fetch the content. For example, the user of the client computer 14 clicks on or selects an embedded link provided by the application server 18 in the content.

In response to the activation, the browser, application, or program of the client computer 14 requests the content from the third-party server 20 in act 56. Rather than or as part of directly requesting the content, a delegation token may be initially requested in order to establish the data flow from the third-party server 20. The token request is pursuant to OAuth, Kerberos, or other token protocol.

The request includes information used to provide the delegation token. For example, HTTP header fields for the application server name and the name of the server (e.g., PCP server) of the access network 16 (e.g., pcp_srv_1@example.net are included. Additional, different, or less information may be provided. Otherwise, the token request messaging is the same as in act 40, just addressed to the host of the different content (e.g., third-party server 20).

In act 58, the third-party server 20 receives the token request. The third-party server identifies the application server name in the request. Based on this name information, a business agreement or other relationship with the operator of the application server 18 is identified. The application server name is used to trigger further provisioning of the delegation token pursuant to the agreement between operators of the application server 18 and the access network 16.

The third-party server 20 signals the name of the server for the access network 16 and any metadata (e.g., flow characteristics of the content) to the application server 18. In one embodiment, the name of the server is a name of a HTTP, PCP, STUN or other server. For example, the PCP server name is transmitted. Additional, different, or less information may be provided, such as not providing the metadata. The information is provided in order to obtain the delegation token from the application server 18 so that the data flow may be established based on content need and/or agreed flow characteristics.

The application server 18 receives the token request from the third-party server 20. For example, an OAuth token request with added information for the name of the server for the access network 16 is received.

The application server 18 verifies that the third-party server 20 is appropriately requesting the token. For example, the application server 18 verifies that an agreement or other relationship exists with the operator of the third-party server 20. The content to be served may be identified so that the request accuracy or fulfillment of the agreement is verified. If no relationship exists between operators and/or for the identified content, then the application server 18 denies the request for the token.

The application server 18 also verifies that the token request is for the access network 16 with which the operator of the application server 18 has an agreement or other relationship. For example, the application server 18 recognizes that the application server operator has a business agreement with the ISP using the PCP server name. The server name for the access network 16 form the request of the third-party server 20 is extracted and used to check for the relationship. If no relationship exists between the operators, then the application server 18 denies the token request.

In act 60, the application server responds with a new handle token meant for the third-party web site. The token is provided where the relationship or relationships are verified. A token, such as an OAuth token, is provided to the third-party server 20 in response to the token request from the third-party server 20. In one embodiment, the token is a handle token, but other types of tokens may be used.

The token is configured to authorize data flow at the resource level (e.g., bandwidth) for the CDN, but for the content of the third-party server 20. The token is configured to establish the resource level by the access network (e.g., by the ISP) for the client computer 14. The requested resource level may be based on the agreement between the operator of the application server 18 and the operator of the third-party server 20 as long as at levels provided for in the agreement between the operator of the application server 18 and the operator of the access network 16. The configuration is for a token meant for the third-party server 20. The token is linked to the third-party server 20 by being provided to the third-party server 20 and/or by including the name of the third-party server. The linking ensures that only flows from the client computer 14 to third-party server 20 are prioritized. The third party server 20 is identified by IP address. The token is also configured by including the same or similar information as the token provided in act 44. The token is provided by the application server 18 to be used by the third-party server 20 for establishing data flow pursuant to the agreement between the application server 18 and the access network 16.

In act 62, the third-party server 20 signals the new token to the client computer 14. The token is transmitted to the client computer with the same or different information than the transmission of the token in act 44. The token is different since each token is unique. Alternatively, the token is specific to the application server 18 and server of the access network 16, so may be the same token in both of acts 44 and 62.

The third-party server 20 may or may not provide metadata for the data flow to be established. The metadata is the same or different than provided in act 44. For example, the metadata includes a resource level request established by the agreement or relationship between operators of the application server 18 and the access network 16, so is the same. As an additional or alternative example, the resource level request is based on the type of content, so may request a different resource level for different types of content.

The third-party server 20 also provides an indication that the owner or authorization server for the token is the application server 18. The name of the application server 18 is provided in the metadata and/or token. The token is provided as a ticket to handle the data flow for the content from the third-party server 20 with a priority, a maximum jitter, at a rate, at a bandwidth, with latency, or combinations thereof. The token and/or metadata include the information needed to establish the data flow by the access network 16 of the content form the third-party server 18 with the resource level appropriate for the application server 18.

In act 64, the client computer 14 requests data flow from the access network 16. This request is handled like act 46. The newly obtained token from the third-party server 20 is used to obtain resource level privileges associated with the token. The server of the access network 16 requests validation of the token from the identified application server 18. In act 66, the application server validates the token in the same way as done in act 48.

Based on the validation, the access network 16 maps the data flow for the content from the third-party server 20 in act 68. The establishing of the data flow in act 68 is handled in a same way as act 50, except the data flow is from the third-party server 20. The metadata or token identifies the third-party server 20 as the source of the content for the data flow. For example, the PCP server of the access network 16 validates the tokens, prioritizes the flow accordingly, and signals the client computer 14 that the flow is accommodated. In act 70, the content of the third-party server 20 is served to the client computer using the established resource level.

In the method of FIG. 3, various acts are performed by devices. The acts may be specific to the devices. Alternatively, the acts are specific to content or websites hosted by the devices. The device (e.g., application server 18 or third-party server 20) perform the act limited to or on behalf of the website. Similarly, the client computer 14 may perform acts specific to a given application, program, or browser.

FIG. 4 shows one embodiment of an apparatus for token delegation for third-party authorization. The apparatus is shown as a simplified block diagram of an example network device, such as the client computer 14, server of the access network 16, application server 18, or third-party server 20 of FIG. 1. In FIG. 4, the example network apparatus or device 70 corresponds to network elements or computing devices that may be deployed in the network. The network device 70 includes software and/or hardware to perform any one or more of the activities or operations for requesting a token, providing a token, validating a token, establishing a data flow, and/or serving content.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices 14, 16, 18, or 20. For example, the network device 70 may include another processor and/or not include the secondary storage 74 or removable media drive 78. Each network device 14, 16, 18, or 20 may include more or less components than other network devices 14, 16, 18, or 20.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any nonvolatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices via one or more networks. In one example, the wireless network interface 75 includes a wireless network interface controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the P2P network. The network device 70 may include any number of ports using any type of connection option.

In one embodiment, the network device 70 is the third-party server 20. The interface 75, 76 is configured to receive a token request from a client device. The token request includes an identification of the access network server (e.g., PCP server of the access network 16) and an identification of the application server 18. The interface is configured by one or more protocols for communicating through one or more ports. In other embodiments, the interface 75, 76 is configured to receive and transmit based on acts of the application server 18, the client computer 14, or the server of the access network 16.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

The memory, such as the external computer-readable media 79, main memory 73, the secondary storage 74, or the cache memory of processor 72, alternatively or additionally stores data. For example, the main memory 73 stores audio, video, conference data (e.g., shared content, audio, and/or video), or combinations thereof. Any content may be stored as part of the third-party server 20. The memory may also store a received token and/or metadata. The memory may store data structure for validating tokens.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

The processor 72, configured by logic or other instructions, to use the interface to transmit and receive data. The processor 72 is configured to perform any of the various acts of the devices. As part of the third-party server 20, the processor 72 is configured to transmit a delegated token request to the application server with the name of the server of the access network 16, receive the delegated token from the application server 18, and transmit the delegated token with the name of the application server 18 to the client computer 14. The processor 72 may be configured to verify an agreement or other relationship between the operator of the processor 72 (e.g., the operator of the third-party server 30) and an operator of the application server 18. As part of the application server 18, the processor 72 is configured to respond to token request, verify agreements or other relationships, generate tokens, validate or authorize tokens, and/or serve content.

The processor 72 operating as part of the application server 18 or the third-party server 20 serves content. The interface 75, 76 is used to serve the audio, video, conference data, and/or other content. The content is served through the access network 16. As part of a server of the access network 16, the processor 72 is configured to receive a token and metadata, validate or authorize the token with the application server 18, verify a relationship with the application server 18, and add a data flow (e.g., map the data channel). The data flow is established with a requested resource level, a resource level set by the relationship, or a different resource level (e.g., at one of various levels satisfying the relationship), and route the content as part of the data flow to the client computer 14.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
serving first content, by an application server, to a client computer through an Internet service provider network, the first content including a link to second content on a third-party server;
receiving a token request, by the application server, from the third-party server in response to selection of the link by the client computer; and
providing a token, by the application server, to the third-party server in response to the token request, the token configured to authorize data flow having a flow characteristic for the second content from the third-party server by the Internet service provider network to the client computer, the data flow authorized based on an agreement for the flow characteristic between an operator of the application server and an operator of the Internet service provider network.

2. The method of claim 1 wherein the second content comprises game interaction, video content, audio content, conference content, or combinations thereof.

3. The method of claim 1 wherein receiving the token request comprises receiving an OAuth token request.

4. The method of claim 1 wherein receiving the token request further comprises receiving a server name of the Internet service provider handling the data flow and the flow characteristic for the data flow of the second content.

5. The method of claim 4 wherein receiving the server name comprises receiving an HTTP, HTTPS, port control protocol or STUN server name.

6. The method of claim 1 further comprising verifying an agreement between the operator of the application server and an operator of the third-party server;
wherein providing comprises providing when the agreement between the operator of the application server and the operator of the third-party server is verified.

7. The method of claim 1 wherein providing the token comprises providing a handle token.

8. The method of claim 1 wherein providing the token comprises providing the token linked to the third-party server.

9. The method of claim 1 further comprising verifying the agreement between the operator of the application server and the operator of the Internet service provider;
wherein providing comprises providing the token when the agreement between the operator of the application server and the operator of the Internet service provider is verified.

10. The method of claim 1 wherein providing comprises providing an OAuth token.

11. The method of claim 1 wherein providing the token comprises providing the token for use by the client computer to establish the data flow with the Internet service provider network for the second content.

12. The method of claim 1 wherein providing the token configured to authorize data flow at the flow characteristic comprises providing the token as a ticket to handle the data flow with a priority, minimum and maximum bandwidth, maximum jitter, at a rate, or combinations thereof.

13. The method of claim 1 further comprising:
receiving a request for another token from the client computer;
transmitting the other token to the client computer; and
validating the other token as received from the Internet service provider network;
wherein serving comprises serving the first content as another data flow established in the Internet service provider based on the other token.

14. A method comprising:
adding a data flow to a user computer from a first content server through an access network server;
establishing the data flow at a resource level of the access network server based on a first agreement between an operator of the access network server and an operator of a second content server; and
authorizing the resource level with an OAuth token from the second content server for the first content server.

15. The method of claim 14, wherein adding comprises adding the data flow as a video data flow, and wherein establishing at the resource level comprises assigning a priority, loss, jitter, bandwidth, or combinations thereof.

16. The method of claim 14 wherein authorizing comprises authorizing with the OAuth token being a handle token provided to the first content server by the second content server, then provided by the first content server to the user computer, and then provided by the user computer to the access network server, further comprising:
validating the handle token by the access network server with the second content server.

17. The method of claim 14 wherein authorizing comprises verifying a second agreement between the operator of the second content server and an operator of the first content server.

18. An apparatus comprising:
a memory configured to store audio, video, or both audio and video;
an interface configured to receive a first token request from a client device, the first token request including an identification of an access network server and an identification of an application server; and
a processor configured to, using the interface, transmit a delegated token request to the application server, receive a delegated token from the application server, and transmit the delegated token to the client device;
wherein the audio, video, or both are served by the processor using the interface to the client device in a data flow through the access network server as validated by the application server.

19. The apparatus of claim 18 wherein the processor is configured to verify an agreement between an operator of the processor and an operator of the application server, and wherein the data flow is established based on another agreement between the operator of the application server and an operator of the network server.

20. The apparatus of claim 18 wherein the first token request is received in response to a link activation for the audio, video, or both audio and video.

* * * * *